United States Patent [19]
Yamazaki

[11] Patent Number: 5,328,239
[45] Date of Patent: Jul. 12, 1994

[54] FLIP-UP TYPE SEAT

[75] Inventor: Ryokichi Yamazaki, Tokyo, Japan

[73] Assignee: Kotobuki Corporation, Tokyo, Japan

[21] Appl. No.: 896,931

[22] Filed: Jun. 11, 1992

[30] Foreign Application Priority Data

Jun. 13, 1991 [JP] Japan .................................. 3-142090

[51] Int. Cl.⁵ .............................................. A47C 1/121
[52] U.S. Cl. ..................................... 297/333; 297/334
[58] Field of Search .................. 297/334, 332, 331-334

[56] References Cited

U.S. PATENT DOCUMENTS

| | | | |
|---|---|---|---|
| 163,611 | 5/1875 | Smith | 297/334 |
| 325,283 | 9/1885 | Stone | 297/334 |
| 363,895 | 5/1887 | Hickman | 297/334 |
| 427,570 | 5/1890 | Harwood | 297/332 |
| 607,275 | 7/1898 | Rainbow | 297/334 |
| 988,515 | 4/1911 | Shutt | 297/332 |
| 1,428,018 | 9/1922 | Erickson . | |
| 1,509,863 | 9/1924 | Erickson . | |
| 1,761,673 | 6/1930 | Laursen . | |
| 2,192,577 | 3/1940 | Jungerman | 297/332 |
| 3,166,091 | 12/1963 | Bethoon et al. . | |
| 3,873,153 | 3/1975 | MacKintosh | 297/334 |

Primary Examiner—Lloyd A. Gall
Attorney, Agent, or Firm—Robbins, Berliner & Carson

[57] ABSTRACT

A flip-up type seat has a seat member support, a seat member, and a seat member coupling mechanism interposed between the seat member support and the seat member to couple the seat member to the seat member support in such a way that the seat member can be freely moved between its horizontal seated position and its vertical flipped-up position. The seat member coupling mechanism cause the rear end of the seat member to be moved up and down in the vertical direction and the front end thereof forward and backward in the horizontal direction when the seat member is moved between its seated position and its flipped-up position.

1 Claim, 8 Drawing Sheets

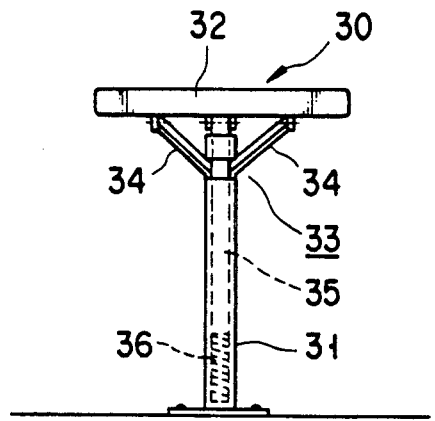
F I G. 6
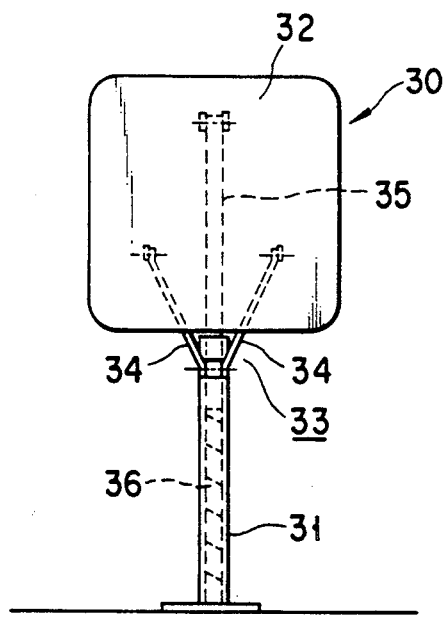
F I G. 7

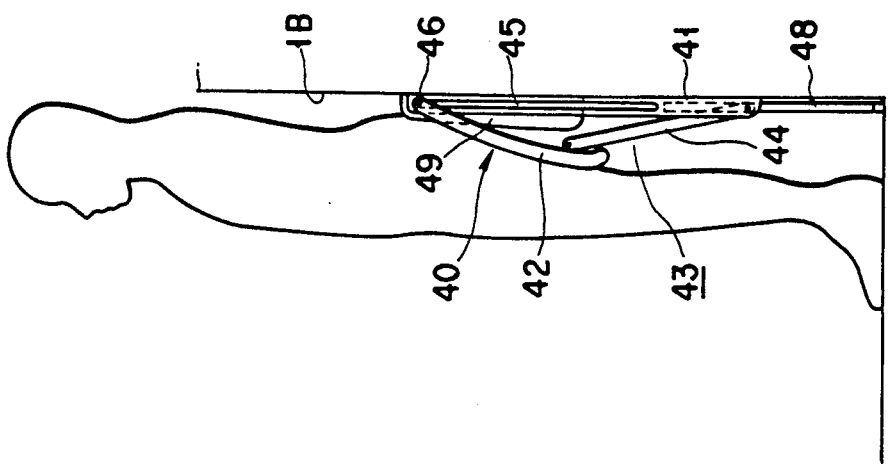
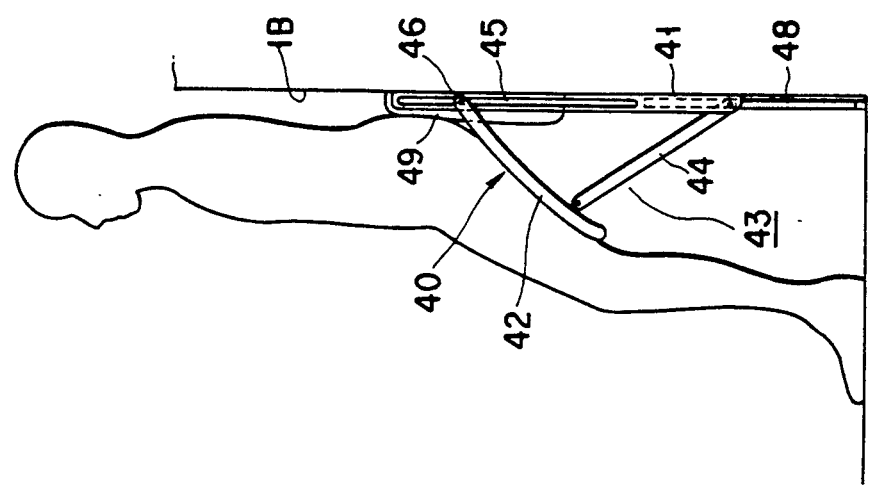
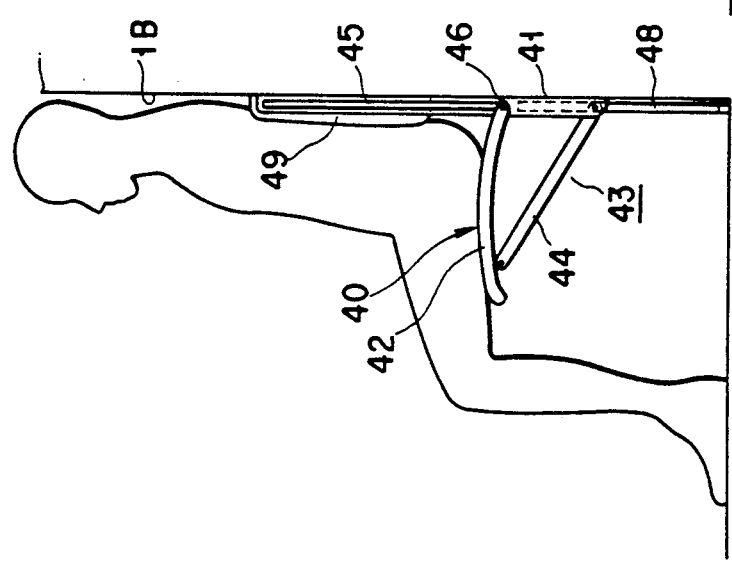
FIG. 8

FLIP-UP TYPE SEAT

BACKGROUND OF THE INVENTION

1. Field of the Invention

The present invention relates to a flip-up type seat having a seat member swingable between its seated position where it is kept substantially horizontal and its flipped-up position where it is kept substantially vertical.

2. Description of the Related Art

The flip-up type seats of this kind have been used as those for student desks in schools, those in conference rooms, theaters and stadiums, those for various kinds of works such as drawing, those in street-cars, buses and commuters' trains and those for public at stations and parks.

In the conventional flip-up type seats, the seat member is swung around its rear end between its seated position where it is kept substantially horizontal in relation to its seat supports such as legs and its flipped-up position where it is kept substantially vertical in relation to them.

FIGS. 11 and 12 show a conventional flip-up type seat applied to a student desk with a seat. Reference numeral 1 denotes a plurality of narrow student desks arranged at certain intervals in a back and forth directions on a floor in a class room. FIG. 11 shows a flat floor, and FIG. 12 shows a stepped floor.

Each of the student desks includes a plurality of legs 2 fixed on the floor and extended upward and a desk top 3 horizontally attached to the tops of the legs 2. Each of the student desks 1 excepting on the first line is provided with a flip-up type seat 4 for use by a student in a front line.

Each flip-up type seat 4 is constructed by a pair of right and left brackets 5 fixed to and projected forward from vertical middle portions of a pair of legs 2 adjacent each other in the plural legs 2 of the student desk 1 on the second, third, ... x-th lines, a pair of right and left seat member support arms 7 swingably supported at their rear end portions by a shaft 6 which is supported horizontal by the paired right and left brackets 5, and a seat member 8 supported by the paired right and left seat member support arms 7. At positions above the paired right and left bracket 5, a seat back 9 is further attached to a pair of legs 2 adjacent to each other in the plural legs 2 of the student desk 1 on each of the second, third, ... x-th line.

In the conventional flip-up type seat 4 having the above-described arrangement, the seat member 8 is located at its flipped-up position where it is swung vertical above the shaft 6, when the seat member 8 is not used. When the user wants to use the seat member 8, the seat member 8 is swung downward around the shaft 6 from its flipped-up position to its seated position where it is kept substantially horizontal.

In most of the conventional flip-up type seats, a twisted coil spring (not shown) is attached to the shaft 6. The seat member 8 is therefore automatically forced from its seated position to its flipped-up position by the twisted coil spring when the seat member 8 is not used.

In order to swing the seat member 8 around the shaft 6 from its flipped-up position to its seated position when the user wants to use the seat member 8, the user must push the seat member 8 downward by his or her own hand or buttocks. When the user uses his or her own hand to swing the seat member 8 from its flipped-up position to its seated position, the user must take half-sitting pose with bending his or her waist or legs. When the user uses his own buttocks, the user must put his or her buttocks on the upward directed front end surface of the seat member 8 which has been flipped up, then sit down while moving his buttocks downward, and further then move backward his or her buttocks on the seat member 8 as the seat member 8 comes nearer its seated position. This is a quite complicated action.

When the user stands up from his or her sitting pose on the seat member 8, the user must use his or her own hand or allow the urging means to swing the seat member 8 from its seated position to its flipped-up position, while keeping his or her half-sitting pose.

The user must take unstable half-sitting pose in either case to swing the seat member 8 between its flipped-up position and its seated position.

In the case of the conventional flip-up type seat 4, the distance B between the rear end of the desk top 3 and the front end of the seat member 8 which is on the way of its being swung is so set as not to catch his or her thighs or body between them while the user is taking half-sitting pose. This distance B thus set limits the size A of the seat member 8 in its back and forth directions. The limited size A does not give the user enough relaxation and comfort on the seat member 8.

In the case of the flip-up type seats 4 having constructions which are obtained by removing the desk tops 3 from the student desks 1, and used in the theater, the user must stand up completely and swing the seat member 8 from its seated position to its flipped-up position so as to allow a person to pass through between the user and the seat 4 on the front line.

The conventional flip-up type seat 4 is sometimes used while leaving its seat member 8 flipped-up. In this case, the user lightly puts his or her buttocks on the upward directed front end surface of the seat member 8 which has been flipped up. However, the front end surface of the seat member 8 has so small an area as to make him or her feel pain at his or her buttocks. In addition, the user's clothes are liable to be soiled and broken by the lower surface of the seat member 8 and the seat support arms 7, which are directed forward when it is flipped up.

Further, the upper surface of the seat member 8 is directed backward when the seat member 8 is left flipped-up. In the class room where the floor is stepped as shown in FIG. 12, therefore, the upper surface of the seat member 8 is liable to be soiled by shoes of an user seated on the seat member 8 of the flip-up type seat 4 on the back line.

SUMMARY OF THE INVENTION

The present invention is derived from the above-mentioned circumstances, and the object of the present invention is therefore to provide a flip-up type seat capable of making it unnecessary for the user to take an unstable pose when the seat member of the seat is moved between its flipped-up position to its seated position; making the user feel relaxed and comfortable when the user is seated on the seat member of the seat; making it unnecessary for the user to completely stand up from the seat member of the seat when a person must be passed through between the user and the flip-up type seat on the front line; preventing the user's clothes from being soiled and broken when the seat is used while leaving its seat member flipped-up; and preventing the upper surface of the seat member, which has been flipped up, from being soiled by shoes of an user who sits on the seat member of the seat in the back line.

The object of the present invention can be achieved by a flip-up type seat comprising: a seat member support, a seat member, and a seat member coupling means interposed between the seat member support and the seat member to couple the seat member to the seat member support in such a way that the seat member can be freely moved between its seated position where it is kept substantially horizontal and its flipped-up position where it is kept substantially vertical, the seat member coupling means causing the rear end of the seat member to be moved up and down in the vertical direction and the front end thereof forward and backward in the horizontal direction when the seat member is moved between its seated position and its flipped-up position.

In the flip-up type seat according to the invention and being constructed as described above, the seat member which has been flipped up directs its rear end upward, its front end downward and its upper surface forward.

When the user wants to sit on the seat member of the seat, therefore, the user needs only to sit down with putting his or her buttocks on the rear end of the seat member. The seat member is thus moved from its flipped-up position to its seated position while moving vertically its rear end downward and horizontally its front end forward. The user's buttocks stays on the rear end of the seat member during this process.

When the user wants to stand up, the user needs only to lift his or her own buttocks upward. The seat member which has been at its seated position is pushed backward at its front end by backs of the user's knees or forced upward at its rear end by the urging means. The seat member is thus moved to its flipped-up position while moving its front end backward and its rear end upward. While returning to its flipped-up position, the seat member can follow the user's buttocks lifted with its upper surface being directed to the buttocks.

This makes the user not to take the unstable pose while the seat member of the seat is moved between its flipped-up position and its seated position.

Even if the size of the seat member in the back and forth directions is made larger so as to make the user feel relaxed and comfortable when the user seats on the seat member of the seat, his or her sitting and standing behavior cannot be disturbed by the rear end of the desk top and the front end of the seat member, although it was impossible in the case of the conventional flip-up type seat.

When the user sitting on the seat member allows that a person pass through between the user and the flip-up type seat in the front line, the user is required to lift his or her buttocks only a little. Because the front end of the seat member is thus moved backward, the user can also move his knees backward. This can prevent the person from being disturbed by the user's knees.

Since the seat member which has been at its flipped-up position directs its upper surface forward, the user who leans against the flipped-up seat member cannot have his clothes soiled or broken by the upper surface of the seat member. Further, the upper surface of the seat member flipped up cannot be soiled by shoes of a person who is seated on the seat member of the seat in the back line.

In the flip-up type seat according to the invention and characterized by being constructed as described above, the seat member coupling means can include link means constructed by two arms both ends of each of which being pivotably connected to the seat member support and the seat member with the connecting points of the two arms on the seat support being separated from each other and those on the seat member being also separated from each other.

This seat member coupling means is simple in structure and operates smoothly.

In the flip-up type seat according to the invention and characterized by being constructed as described above, it is preferable that the seat member coupling means includes means for urging at least one of the two arms upward.

This urging means enables the seat member to be automatically returned from its seated position to its flipped-up position.

In the flip-up type seat according to the invention and characterized by being constructed as described above, the seat member coupling means can include a pair of guide grooves formed in at least one of the seat member support and the seat member, and a pair of guide rods mounted on the other of them and having their movement guided by the paired guide grooves.

This seat member means cannot spoil the appearance of the flip-up type seat because it is not exposed outside.

In the flip-up type seat according to the invention and characterized by being constructed as described above, it is preferable that the seat member coupling means includes means for urging the rear end of the seat member upward.

This urging means enables the seat member to be automatically returned from its seated position to its flipped-up position.

In the flip-up type seat according to the invention and characterized by being constructed as described above, the seat member coupling means can include a vertically movable member having one end portion pivotably connected to a position of the seat member near the rear end thereof and the other end portion vertically movably supported on the seat member support, and a swingable member having one end portion pivotably connected to a position of the seat member located in front of the above described one end portion of the vertically movable member, and the other end portion pivotably connected to the seat member support.

This seat member coupling means is simple in structure and can be made compact because most of the weight of the user is supported by the vertically movable member. This is suitable for a seat for drawing on which the user needs not to sit down deeply, and for a flip-up type seat used in a narrow place.

In the flip-up type seat according to the invention and characterized by being constructed as described above, it is preferable that the seat member coupling means includes means, interposed between the seat member support and the seat member, for urging the rear end of the seat member upward. It is also preferable that the seat member support has a vertically extending pipe member, that the vertically movable member of the seat member coupling means is a piston member vertically slidably supported by the pipe member, and that the other end portion of the swingable member of the seat member coupling means is pivotably connected to the pipe member and urging means is arranged in the pipe member of the seat member support to urge the piston member upward so that the rear end of the seat member is urged upward by the urging force of the urging means.

The urging means combined with the seat member coupling means does not need to be exposed, thereby not hampering compactness of the seat member coupling means.

In the flip-up type seat according to the invention and characterized by being constructed as described above, the seat member coupling means can include a guide groove formed in the seat member support to extend in the vertical direction, a guide rod mounted at a position of the rear end thereof and guided its movement by the guide groove of the seat member support, and a swingable member having one end portion pivotably connected to a position of the seat member in front of the guide rod and the other end portion pivotably connected to on the seat member support.

This seat member coupling means enables the flip-up type seat, which is located at its flipped-up position, to be made smaller in size. Therefore, this seat member coupling means is most suitable for a flip-up type seat for a vehicle, which is used with it being attached to the side wall and pillars.

It is also preferable in this case that the seat member coupling means includes means for urging the rear end of the seat member upward.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a front view showing the workman's seat of FIG. 5 with its seat member being located at its seated position;

FIG. 7 is a front view showing the workman's seat of FIG. 5 with its seat member being located at its flipped-up position;

FIG. 8 is a side view showing how a vehicle seat according to a fourth embodiment of the flip-up type seat of the present invention is operated;

DETAILED DESCRIPTION OF THE PREFERRED EMBODIMENTS

Various embodiments according to a flip-up type seat of the present invention will be described in detail with reference to FIGS. 1 through 10.

Figure 1:
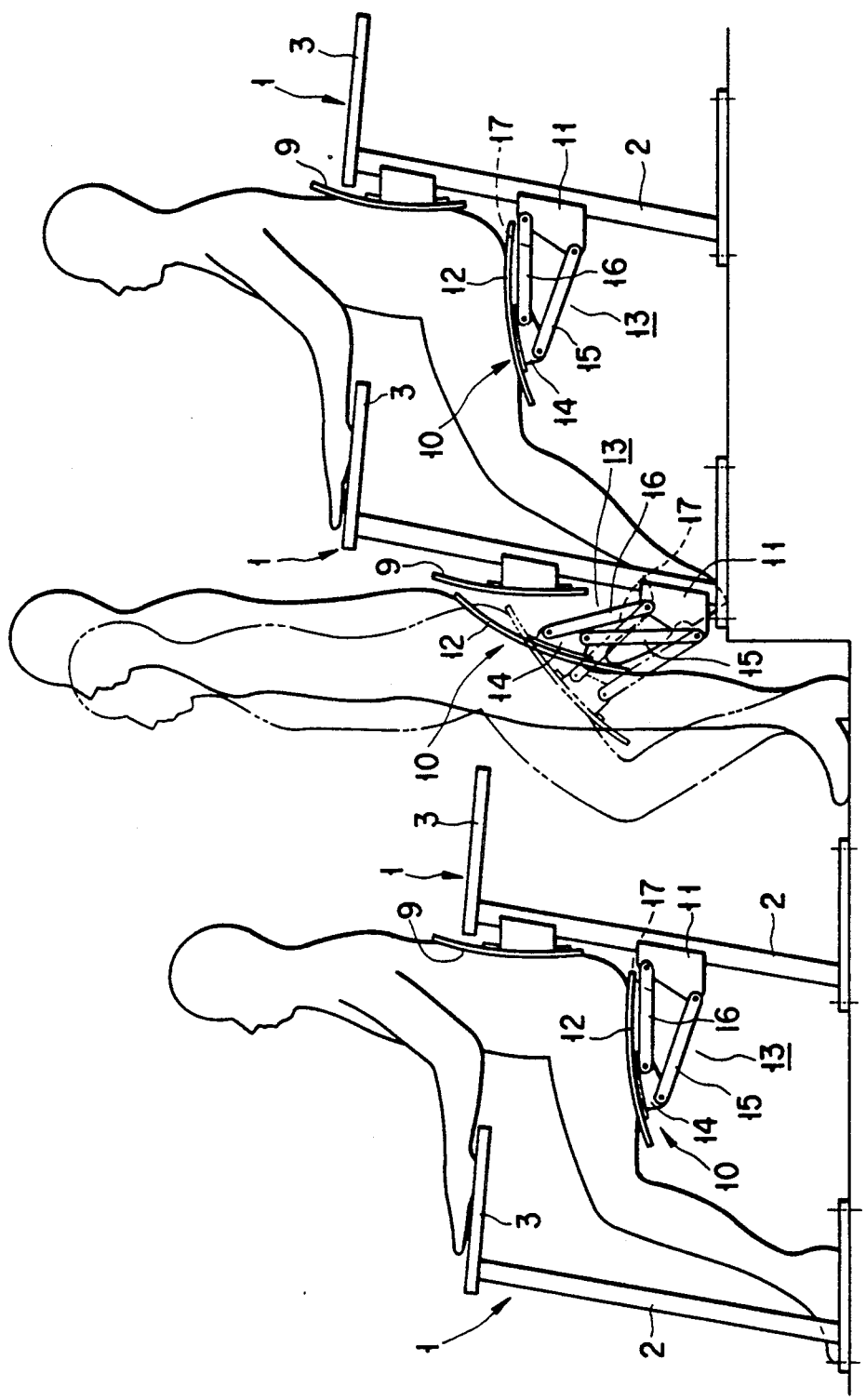
FIG. 1 is a side view showing student seats for student desks according to a first embodiment of a flip-up type seat of the present invention.
Figure 2:
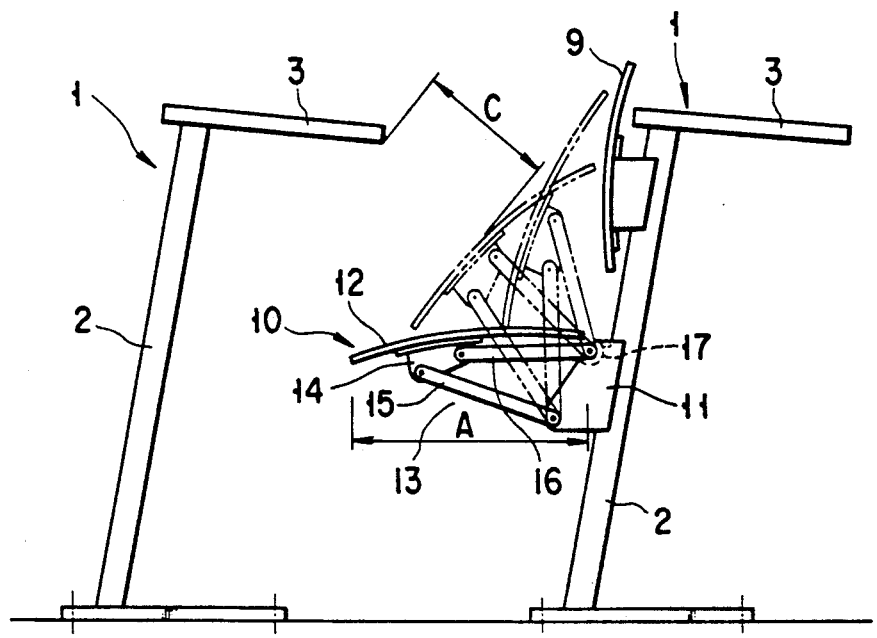
FIG. 2 is a side view showing how the student seat for the student desk shown in FIG. 1 is operated.

FIGS. 1 and 2 show a student seat for a student desk according to a first embodiment of the flip-up type seat of the present invention. The structure of the student desk shown in FIGS. 1 and 2 is the same as that of the conventional student desk described with reference to FIGS. 11 and 12 with exception of the flip-up type seat of the first embodiment. Therefore, the same components of the desk shown in FIGS. 1 and 2 as those of the conventional one shown in FIGS. 11 and 12 will be denoted by the same reference numerals and detailed description of these components will be omitted.

In the flip-up type seat 10 of this embodiment, a bracket 11 is fixed to each of a pair of neighboring legs 2 of each student desk 1 in each of the second, third fourth, . . . x-th lines, at a position under a seat back 9, and projects forward from the legs 2. The brackets 11 fixed to the legs 2 constitutes a seat member support in the flip-up type seat 10.

Each of two arms 15 and 16 is connected at its one end portion to the frontward projected end portion of each of the brackets 11 so as to be vertically freely pivotable with the connecting points of the two arms 15 and 16 to the same bracket 11 being separated from each other in the vertical direction. The other ends of the arms 15 and 16 are connected to front and rear positions of the corresponding one of paired seat member support frames 14 so as to be vertically freely pivotable, and the support frames 14 are fixed to the left and right side portions of the lower surface of a seat member 12.

The two arms 15 and 16 connected freely pivotably to the two positions of the seat member support bracket 11 and the two positions of the seat member support frame 14 form link means, and the link means serves as a seat member coupling means 13 for making the seat member 12 move between a rested position where the seat member 12 is set substantially horizontal and a flipped-up position where the seat member 12 is set substantially vertical.

An urging means constructed by a torsion coil spring 17 is wound around a pivotal center shaft of the one end portion of one arm 16, and the spring 17 urges the arm 16 upward.

When the seat member 12 is not used in the flip-up type seat 10 of this embodiment, one arm 16 is urged upward by the torsion coil spring 17. Therefore, the link means of the two arms 15 and 16 moves the front end of the seat member 12 of the substantially horizontal seated position backward and the rear end thereof upward, and finally the seat member 12 is located at its vertical flipped-up position positioned before the seat back 9 at which the upper surface of the seat member 12 directs forward.

When the user who wants to sit on the seat member 12, the user standing at first presses his or her buttocks against the upper surface of the flipped-up seat member 12, as shown in FIG. 1. The user then sits down, so that the seat member 12 is pushed down by his or her own buttocks against the urging force of the torsion coil spring 17. From the flipped-up position the front end of the seat member 12 is moved forward and it's rear end portion is moved downward, and finally the seat member 12 is located at its horizontal seated position at which the upper surface of the seat member 12 directs upward.

When the user stands up, the above described process is reversed.

Figure 11:
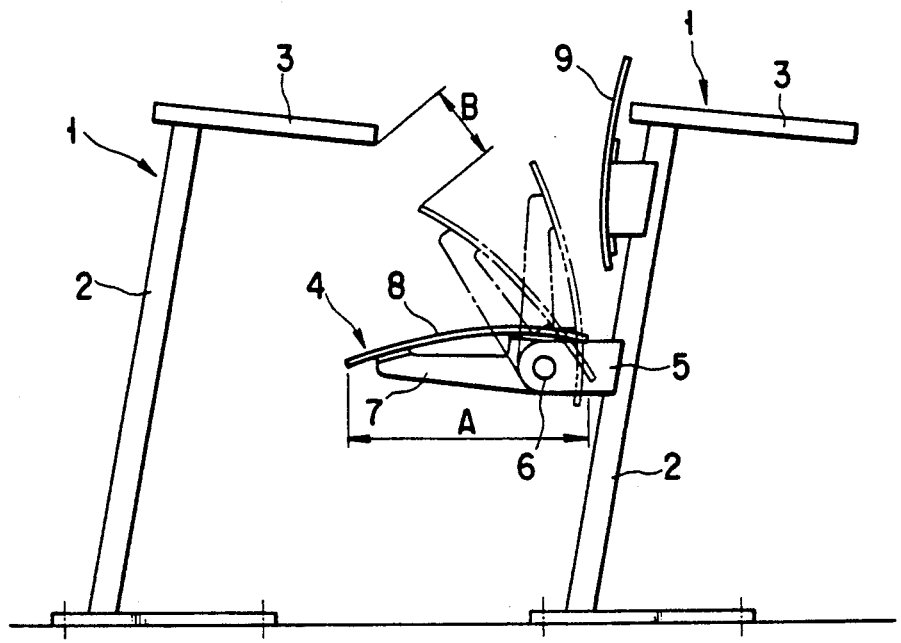
FIG. 11 is a side view showing a conventional student seat for a student desk set on a flat floor.

Since the front end of the seat member 12 is moved in the back and forth directions when the seat member 12 is moved between its flipped-up position and its seated position, the smallest distance C (FIG. 2) between the seat member 12 and the rear end of the desk top 3 is quite larger than that B in the case of the conventional flip-up type seat shown in FIG. 11. Even if the size A of the seat member 12 in the back and forth directions is made so larger than that of the conventional flip-up type seat as to make the user comfortable on the seat member 12, therefore, the user's thighs or buttock's can be prevented from being sandwitched between the seat member 12 and the rear end of the desk top 3 when the seat member 12 is moved between its flipped-up position and its seated position.

When the user takes half-sitting pose while changing his or her pose from standing position to sitting position, the whole of his or her buttocks is supported by the upper surface of the seat member 12. Therefore, the user can be kept stable even when he or she takes half-sitting pose.

As soon as the user lifts up his or her buttocks a little, the front end of the seat member 12 moves backward, thereby allowing his or her knees to be moved backward. When the legs 2 of the seat 10 have no desk top 3, therefore, the user is not required to lift his or her buttocks for a big distance in order to allow a person to pass through between the user and the lift-up type seat 10 of the front line.

In a case that the user taking standing pose leans himself or herself against the seat member 12 of the flip-up type seat 10 which has been flipped up, the user's clothes contacts the upper surface of the seat member 12 which has been directed forward. This prevents the user's clothes from being soiled and broken by the seat member 12 which has been flipped up. In addition, since the user contacts the seat member 12 through its upper surface having large area, the user cannot feel any pain even when the user leans for a long time himself or herself against the seat member 12 which has been flipped up.

Figure 12:
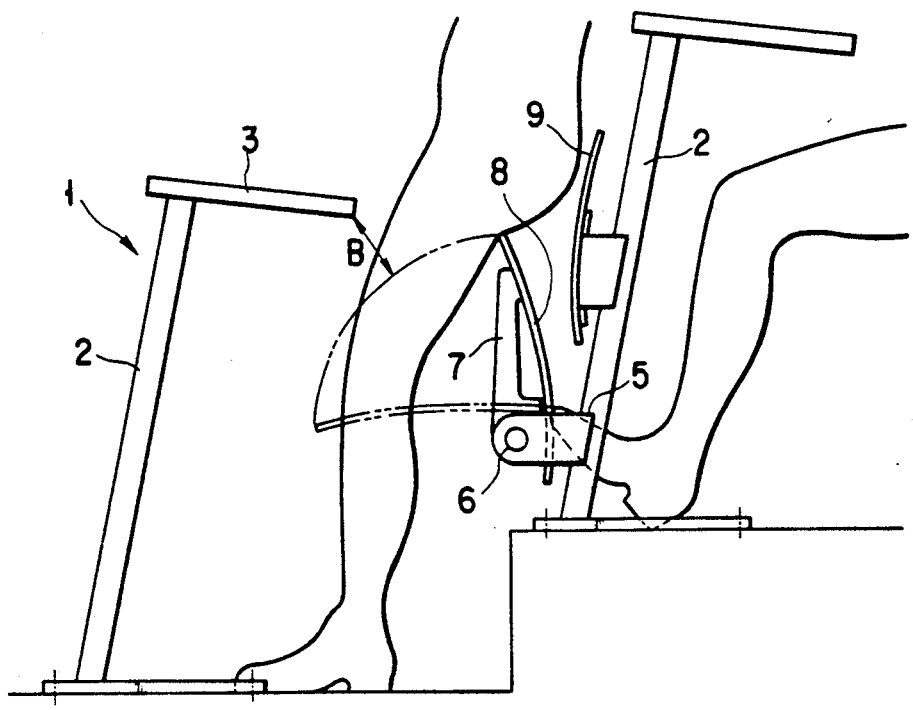
FIG. 12 is a side view showing the conventional student seat for the student desk set on a stepped floor.

Since the lower surface of the seat member 12 directs backward while the seat member 12 is in its flipped-up position, the upper surface of the seat member 12 which has not been used is not soiled by shoes of the user who is now seated on the seat 10 in the behind line even if the flip-up type seats 10 are set on the stepped floor, as shown in FIG. 12.

Figure 3:
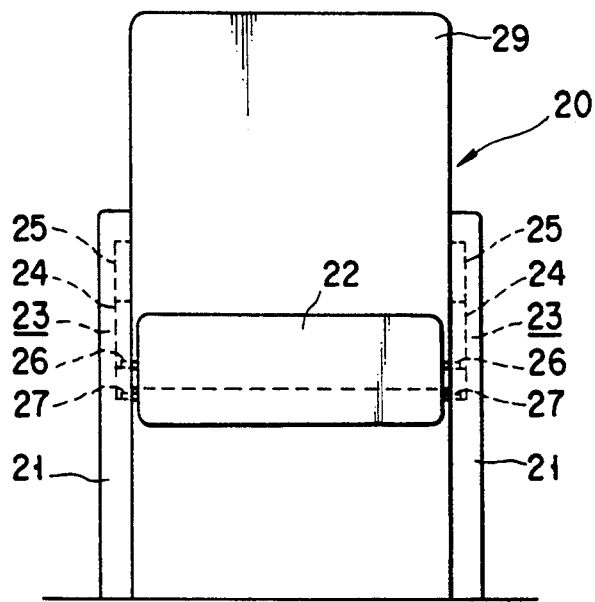
FIG. 3 is a front view showing a theater seat according to a second embodiment of the flip-up type seat of the present invention.
Figure 4:
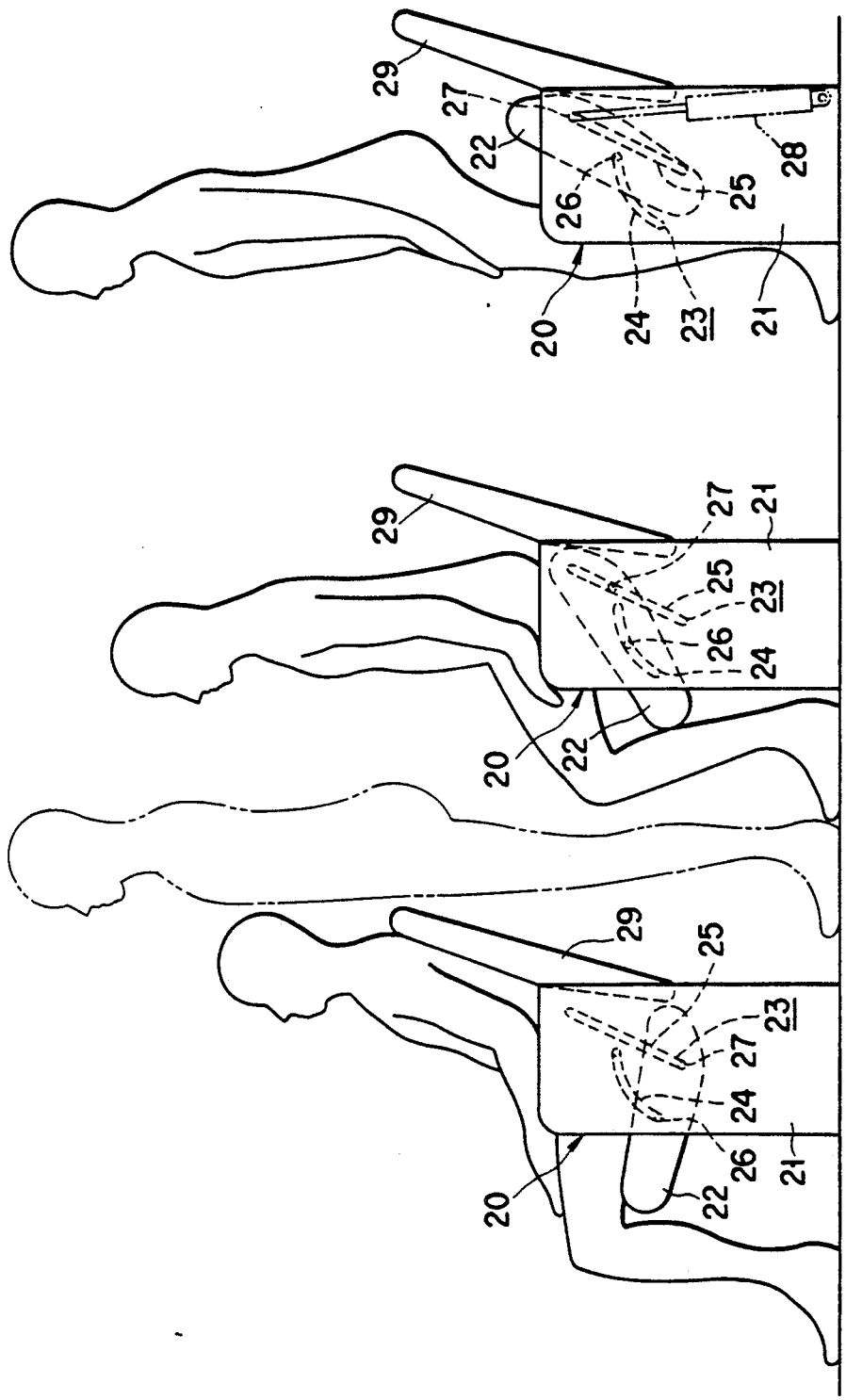
FIG. 4 is a side view showing how the theater seat shown in FIG. 3 is operated.

FIGS. 3 and 4 show a theater seat 20 of the flip-up type seat according to a second embodiment of the present invention.

The theater seat 20 includes a pair of side boards 21 fixed on the floor at a certain interval. These paired side boards 21 are used as legs, and construct seat member support. Their upper surfaces are used as arm support members for a person who is seated on the seat 20.

Both sides of a cushioned seat back 29 are fixed to rear end portions of the paired side boards 21 with the seat back 29 being tilted backward a little.

First and second guide grooves 25 and 24 are formed in each of opposed inner surfaces of the paired side boards. The first guide groove 25 extends linearly and substantially parallel to the cushioned seat back 29 at a position near to the seat back 29, and the second guide groove 24 is positioned in front of the first guide groove 25 and is arched with its rear end being higher than its front end.

A cushioned seat member 22 is positioned between the paired side boards 21, and guide rods 27 and 26 extending from both sides of the cushioned seat member 22 at its rear and middle portions are inserted into the first and second guide grooves 25 and 24 of the paired side boards 21.

When the rear end guide rod 27 and the middle portion guide rod 26 are positioned at the rear ends of the corresponding first and second guide grooves 25 and 24, the cushioned seat member 22 is located at its flipped-up position in which its front end directs downward, its rear end directs upward and its upper surface directs forward.

A gas spring 28 is connected to both the guide rod 27 of the rear end of the cushioned seat member 22 and the corresponding one side board 21. The gas spring 28 urges upward the rear end of the cushioned seat member 22.

When the user sits down on the seat member 22, while putting his or her buttocks on the rear end of the cushioned seat member 22 which has been flipped up, the rear end guide rod 27 is forced downward along the first guide groove 25 and the rear end of the cushioned seat member 22 is also moved downward against the gas spring 28. At the same time, the middle portion guide rod 26 is guided forward along the second guide groove 24, and the front end of the cushioned seat member 22 is moved forward.

When the guide rod 27 reaches the lower end of the first guide groove 25 and the guide rod 26 reaches the front end of the second guide groove 24, the cushioned seat member 22 of the seat member 20 is located at its substantially horizontal seated position.

Since the rear end of the cushioned seat member 22 which has been at its seated position is urged upward by the gas spring 28, the guide rod 27 is forced upward along the first guide groove 25 and the rear end of the seat member 22 is thus moved upward when the user stands up from his sitting pose. At the same time, the middle portion guide rod 26 is guided backward along the second guide groove 24 and the front end of the seat member 22 is thus moved backward. The seat member 22 is thus finally located at its flipped-up position.

In this embodiment, the guide rod 27 of the rear end portion of the cushioned seat member 22, the guide rod 26 of the middle portion thereof, and the first and second guide grooves 25 and 24 to which the guide rods 27 and 26 are inserted, construct seat member coupling means 23 for moving the cushioned seat member 22 between its flipped-up position and its seated position. Same merits as those in the case of the above-described student seat 10 for the student desk according to the first embodiment of the present invention can be achieved by the theater seat 20.

Figure 5:
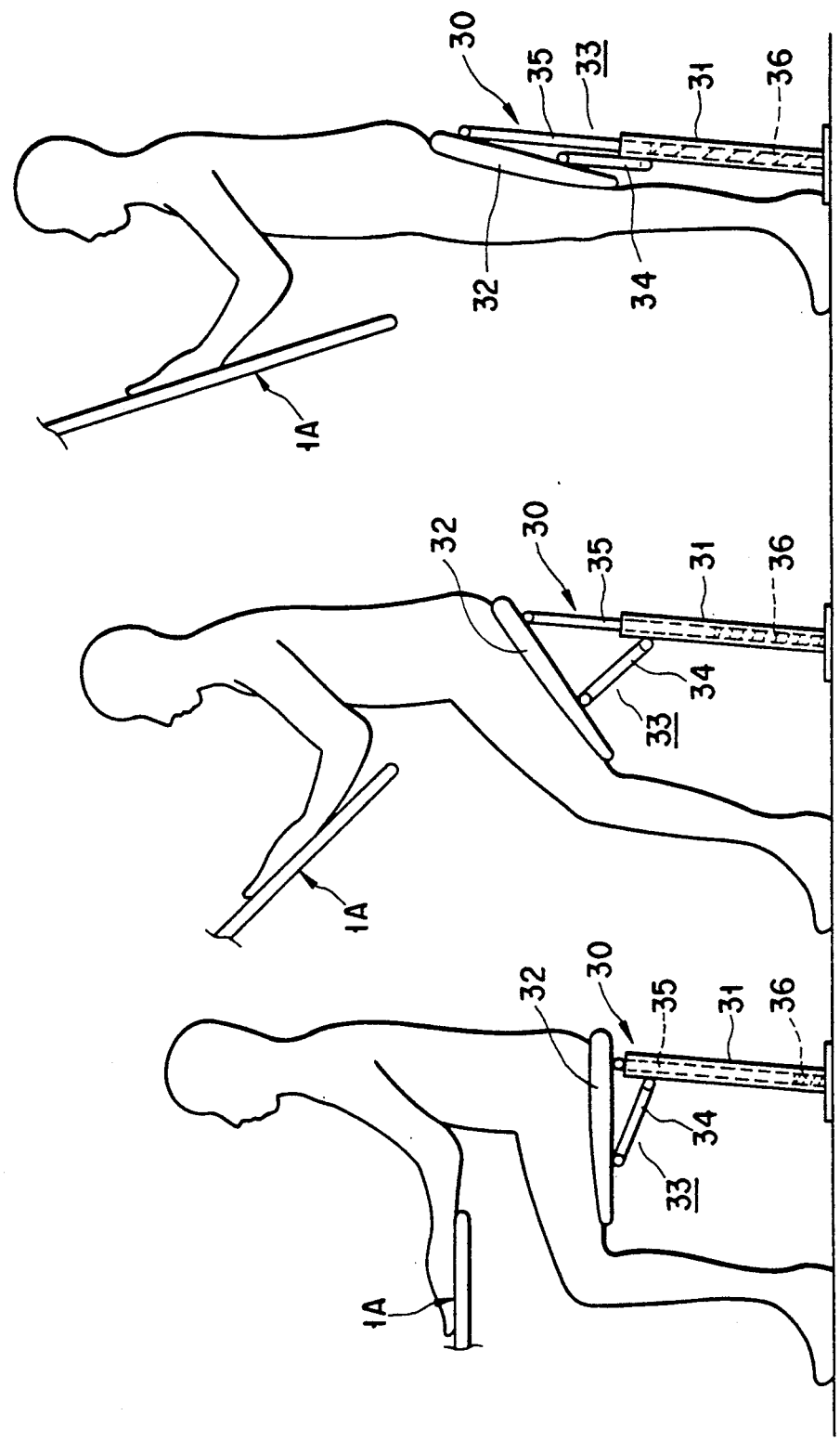
FIG. 5 is a side view showing how a workman's seat according to a third embodiment of the flip-up type seat of the present invention is operated.

FIGS. 5 through 7 show a workman's seat 30 which is according to a third embodiment of the flip-up type seat of the present invention, and which is suitable for a draftman, for example.

A leg 31 which serves as a seat member support of the workman's chair 30 is constructed by a pipe member which is fixed to a floor to extend upward. A rod-shaped piston member 35 is inserted into the leg 31 to be freely slidable up and down. Means 36 for urging the piston member 35 upward is interposed between the lower end of the piston member 35 and that of the leg 31. In this embodiment, the urging means 36 is constructed by a compression coil spring.

The upper end of the piston member 35 is connected to the rear end portion of the lower surface of a seat member 32 so as to be pivotable in the vertical direction. Paired swingable members 34 are connected at one end of each of them to the right-handed or left-handed front end portions of the lower surface of the seat member 32, and connected at the other ends to the upper end portion of the leg 31 so as to be pivotable in the vertical direction.

When the workman's chair 30 is not used, the piston member 35 is urged upward by the urging means 36. The rear end of the seat member 32 is thus moved upward and the front end thereof backward by the action of the paired swingable members 34. As the result, the seat member 32 is located at its flipped-up position in which its rear end directs upward, its front end directs downward and its upper surface directs forward.

When the user sits down, putting his or her buttocks on the upward directed rear end of the seat member 32 which has been located at its flipped-up position, the rear end of the seat member 32 moves downward the piston member 35 against the urging force of the urging means 36 and the front end of the seat member 32 is pushed forward by the action of the paired swingable members 34. The seat member 32 is thus finally located at its substantially horizontal seated position.

Since the seat member 32 which has been located at its seated position is urged upward at its rear end by the urging means 36, the piston member 35 is moved upward in the leg 31 to move the rear end of the seat member 32 upward when the user stands up from his sitting pose. At the same time, the paired swingable members 34 act to move backward the front end of the seat member 32. The seat member 32 is thus located at its flipped-up position.

In this embodiment, the piston member 35 of the rear end portion of the seat member 32 and the paired swingable members 34 of the front end portion of the seat member 32 serve as seat member coupling means 33 for moving the seat member 32 between its flipped-up position and its seated position.

Same merits as those in the case of the above-described student seat 10 for the student desk according to the first embodiment of the flip-up type seat can also be achieved by the workman's seat 30.

When a valve lock type gas spring is used as the urging means 36 in the workman's seat 30, the seat member 32 can be stopped at any desired angle between its flipped-up position and its seated position. When a working table 1A such as the drawing board is used at a desired angle, therefore, the seat member 32 can be set at any angle suitable for the workman to stably work at the working table 1A.

Plural casters can be attached to the lower end of the leg 31 through support members so that the workman's seat 30 can be freely moved on the floor.

Figure 9:
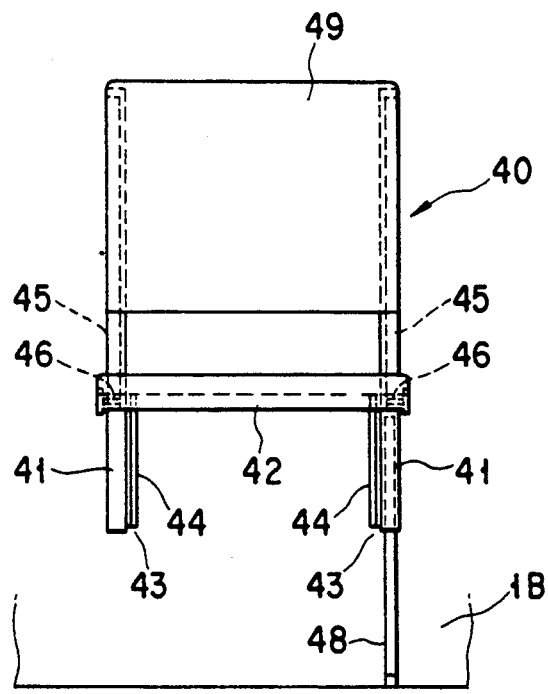
FIG. 9 is a front view showing the vehicle seat of FIG. 8 with its seat member being located at its seated position.
Figure 10:
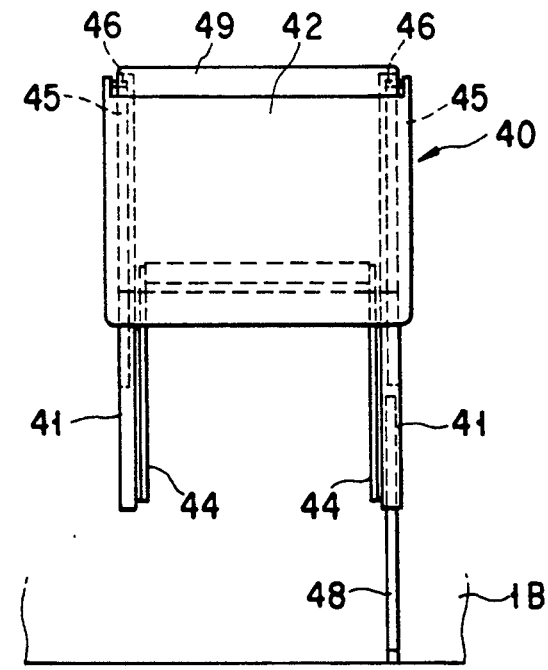
FIG. 10 is a front view showing the vehicle seat of FIG. 8 with its seat member being located at its flipped up position.

FIGS. 8 through 10 show a vehicle seat 40 which is according to a fourth embodiment of the flip-up type seat of the present invention and which is suitable for use in vehicles such as the commuters' train.

A pair of vertically extending support frames 41 which serve as a seat member support for the vehicle seat 40 are fixed to the wall of a coach of a train so as to be separated at a predetermined distance from each other. A cushioned seat back 49 is also fixed to the wall of the coach between the upper end portions of the paired frames 41.

A guide groove 45 is formed in each of the paired support frames 41 to extend vertically from the upper end of its corresponding frame to a position adjacent to the lower end thereof. A pair of guide rods 46 fixed to the rear end portions of both side surfaces of a seat member 42 are inserted into their corresponding guide grooves 45. One end portion of each of a pair of swingable members 44 is vertically pivotably connected to the corresponding one of the lower end portions of the paired support frames 41, and the other end portions thereof are vertically pivotably connected to the front end portion of the lower surface of the seat member 42. Urging means 48 such as a gas spring is interposed between one of the paired guide rods 46 and the floor of the coach to urge the rear end of the seat member 42 upward through the above described one of the guide rods 46.

When the vehicle seat 40 having the above-described arrangement is not used, the paired guide rods 46 of the rear end portion of the seat member 42 are urged by the urging force of the urging means 48 to be moved to the upper ends of the paired guide grooves 45 in the paired support frames 41, and the front end of the seat member 42 is moved backward by the action of the paired swingable members 44. As the result, the seat member 42 is located at its flipped-up position in front of the cushioned seat back 49 to be laid along the wall of the coach with its rear end directing upward, its front end directing downward and its upper surface directing forward.

When the user sits down, putting his or her buttocks on the upward directed rear end of the seat member 42 which has been at its flipped-up position, the rear end portion of the seat member 42 is moved downward to force the paired guide rods 46 downward along the guide grooves 45 in the paired support frames 41 against the urging force of the urging means 48, and the front end portion thereof is pushed forward by the action of the paired swingable members 44. As the result, the seat member 42 is located at its substantially horizontal seated position.

When the user stands up from his or her sitting pose, the rear end portion of the seat member 42, which has been located at its seated position and is urged upward at its rear end portion by the urging force of the urging means, is moved upward with the paired guide rods 46 being moved upward along the paired guide grooves 45 of the paired support frames 41, and the front end portion thereof is drawn backward by the action of the paired swingable members 44. The seat member 42 is finally located at its flipped-up position.

In this embodiment, a combination of the paired guide rods 46 of the rear end portion of the seat member 42 and the paired guide grooves 45 of the paired support frames 41 into which the guide rods 46 are inserted, and the paired swingable members 44 construct seat member coupling means 43 for moving the seat member 42 between its flipped-up position and its seated position.

Same merits as those in the case of the student seat 10 for the student desk according to the first embodiment of the flip-up type seat can also be achieved by the vehicle seat 40.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A flip-up type seat comprising:

a seat member support;

a seat member, a cross-section of which in back and forth directions of said flip-up type seat has such a shape that a center portion of said seat member projects from both end portions of said seat member; and a seat member coupling means interposed between said seat member support and said seat member to couple said seat member to said seat member support in such a way that said seat member can be freely moved between a seated position where said seat member is kept substantially horizontal with the projected center portion being projected upward and a flipped-up position where said member is kept substantially vertical with the projected center portion being projected forward, said seat member coupling means causing a rear end of said member to be moved up and down in the vertical direction and a front end thereof forward and backward in the horizontal direction when said seat member is moved between the seated position and the flipped-up position;

said seat member coupling means including a bracket fixed to said seat member support, link means constructed by two arms arranged vertically with respect to each other, both ends of each of which being pivotably connected to said bracket and to said seat member, the connecting points of said two arms on said bracket being separated from each other in a vertical direction when said seat member is located in both the seated and flipped-up positions, and those on said seat member being separated from each other in the vertical direction when said seat member is located in the flipped-up position and being separated from each other in the vertical and back and forth directions when said seat member is located in the seated position, and said seat member coupling means further including means, provided at the connecting point of the upper arm of the link means on said bracket, for urging the upper arm upward to move said seat member from said seated position to said flipped-up position.

* * * * *